United States Patent
Bjorgvinsdottir et al.

(10) Patent No.: US 10,147,200 B2
(45) Date of Patent: Dec. 4, 2018

(54) QUALITY MEASUREMENT WEIGHTING OF IMAGE OBJECTS

(71) Applicant: Axis AB, Lund (SE)

(72) Inventors: Hanna Bjorgvinsdottir, Lund (SE); Jiandan Chen, Lund (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 15/464,927

(22) Filed: Mar. 21, 2017

(65) Prior Publication Data
US 2018/0276845 A1  Sep. 27, 2018

(51) Int. Cl.
| G06K 9/00 | (2006.01) |
| G06T 7/73 | (2017.01) |
| G06N 3/04 | (2006.01) |
| G06N 3/08 | (2006.01) |
| G06K 9/62 | (2006.01) |
| G06T 11/60 | (2006.01) |

(52) U.S. Cl.
CPC .............. *G06T 7/73* (2017.01); *G06K 9/6265* (2013.01); *G06K 9/6267* (2013.01); *G06K 9/6292* (2013.01); *G06N 3/04* (2013.01); *G06N 3/084* (2013.01); *G06T 11/60* (2013.01); *G06T 2207/20084* (2013.01); *G06T 2210/22* (2013.01)

(58) Field of Classification Search
None
See application file for complete search history.

(56) References Cited

U.S. PATENT DOCUMENTS

| 8,473,218 B2* | 6/2013 | Listgarten ............... G06F 19/18 |
| | | 702/19 |
| 9,342,759 B1 | 5/2016 | Chen et al. |
| 2006/0034484 A1 | 2/2006 | Bahlmann et al. |
| 2007/0154100 A1 | 7/2007 | Au et al. |
| 2008/0112593 A1 | 5/2008 | Ratner et al. |

(Continued)

OTHER PUBLICATIONS

Cuffaro Giovanni et al: "Segmentation Free Object Discovery in Video", Nov. 24, 2016 (Nov. 24, 2016), Network and Parallel Computing; [Lecture Notes in Computer Science; Lect.Notes Computer], Springer International Publishing, Cham, p. 25-31.

(Continued)

*Primary Examiner* — Stephen P Coleman
(74) *Attorney, Agent, or Firm* — Mollborn Patents, Inc.; Fredrik Mollborn (57) ABSTRACT

Methods and apparatus, including computer program products, implementing and using techniques for classifying an object occurring in a sequence of images. The object is tracked through the sequence of images. A set of temporally distributed image crops including the object is generated from the sequence of images. The set of image crops is fed to an artificial neural network trained for classifying an object. The artificial network determines a classification result for each image crop. A quality measure of each classification result is determined based on one or more of: a confidence measure of a classification vector output from the artificial neural network, and a resolution of the image crop. The classification result for each image crop is weighed by its quality measure, and an object class for the object is determined by combining the weighted output from the artificial neural network for the set of images.

10 Claims, 8 Drawing Sheets

(56) References Cited

U.S. PATENT DOCUMENTS

| | | | |
|---|---|---|---|
| 2008/0129825 A1* | 6/2008 | DeAngelis | A63B 24/0021 |
| | | | 348/169 |
| 2013/0144814 A1* | 6/2013 | Klinger | G06N 7/005 |
| | | | 706/12 |
| 2015/0301171 A1* | 10/2015 | Noyes | G01S 13/589 |
| | | | 342/113 |

OTHER PUBLICATIONS

European Search Report. Application No. 17162547.8. European Patent Office, 80298 Munich, Germany. Date of Completion of the Search: Sep. 13, 2017. pp. 1-9.

Galteri Leonardo et al: 11 Spatio-Temporal Closed-Loop Object Detection', IEEE Transactions on Image Processing, IEEE Service Center, Piscataway, NJ, US, vol. 26, No. 3; Jan. 9, 2017 (Jan. 9, 2017), pp. 1253-1263.

Kai Kang et al: "T-CNN: Tubeless with Convolutional Neural Networks for Object Detection from Videos", IEEE Transactions on Circuits and Systems for Video Technology, Aug. 23, 2016 (Aug. 23, 2016), pp. 1-1.

Kang Kai et al: "Object Detection from Video Tubelets with Convolutional Neural Networks", 2016 IEEE Conference on Computer Vision and Pattern Recognition (CVPR), IEEE, Jun. 27, 2016 (Jun. 27, 2016), pp. 817-825.

\* cited by examiner

QUALITY MEASUREMENT WEIGHTING OF IMAGE OBJECTS

BACKGROUND

The present invention relates to image processing, and more specifically, to object recognition in a video stream. Artificial neural networks, such as Convolutional Neural Networks (CNNs) are often used when performing image classification. A common setup for CNNs trained for image classification is to have the last layer of the CNN contain as many outputs as there are classes. This layer is referred to herein as a classification vector.

Typically, a multinomial logistic regression function, such as a Softmax function is applied to the classification vector, normalizing the values so that they sum to one, thereby creating a probability distribution where each probability (confidence) corresponds to a certain class. The i:th confidence value is then interpreted as the probability that the image depicts an object of class i.

To increase the accuracy of CNN classifiers, it is common to feed several crops of an object from the same image to the classifier, using the mean output as a final confidence vector for the object. While such methods may be suitable for individual images, the classification accuracy improvement is limited. Thus, there is a need to improve accuracy for the classification, and more precisely to provide techniques that improve the classification accuracy in a video stream, in computationally efficient ways.

SUMMARY

According to a first aspect, the invention relates to a method, in a computer system, for classifying an object occurring in a sequence of images. The method includes:
 tracking the object through the sequence of images;
 generating, from the sequence of images, a set of temporally distributed image crops including the object;
 feeding the set of image crops to an artificial neural network trained for classifying an object;
 determining, by the artificial neural network, a classification result for each image crop;
 determining a quality measure of each classification result, wherein the quality measure is determined based on one or more of: a confidence measure of a classification vector output from the artificial neural network, and a resolution of the image crop;
 weighting the classification result for each image crop by its quality measure; and
 determining an object class for the object by combining the weighted output from the artificial neural network for the set of images.

This provides a way of improving the accuracy with which objects occurring in video streams, for example, can be identified. At the same time, the methods in accordance with the invention do not need extra significant computational power, and are therefore suitable for embedded devices, such as cameras or mobile devices. Once the objects have been identified, further operations can be performed on the objects, such as object recognition, object feature extraction, object re-identification, etc., just to mention a few examples.

According to one embodiment the sequence of images are obtained from a captured video stream. This not only enables "on the fly" identification of objects occurring in a video stream, but can also allow identification of objects in a previously recorded and stored video stream, both with little or no manual intervention. When identifying objects in a recorded video, the frame rate can be adjusted according to an object classification confidence value. For example, when the confidence value is low, more frames of same object can be used in order to improve the classification accuracy.

According to one embodiment, the artificial neural network can be, for example, a convolutional neural network or a back propagation neural network. Having the ability to choose between different types of artificial neural networks makes it possible to select a type of artificial neural network that is best suited for a particular surveillance situation.

According to one embodiment, the confidence measure of the classification vector is determined prior to applying a multinomial logistic regression function to the classification vector. This preserves as much information as possible that can be used to calculate an entropy of the classification vector, as the multinomial logistic regression function typically "squashes" the data in the classification vector to reduce the influence of extreme values or outliers in the data without removing them from the dataset, thereby losing data that is valuable for other calculations, such as entropy calculations.

According to one embodiment, the multinomial logistic regression function is a Softmax regression function. The Softmax regression function is well known to those having ordinary skill in the art, and only requires lightweight calculations, making it suitable for implementation on an embedded device.

According to one embodiment, the confidence measure of the classification vector is determined by calculating an entropy for the classification vector. Entropy calculations (i.e. measure of uncertainty for a certain outcome) are also well known to those having ordinary skill in the art, and only require lightweight calculations, making them suitable for implementation on an embedded device.

According to one embodiment, the entropy is a Shannon entropy, which is a conventional method of calculating entropy, and which has been tested and verified over several decades and in various situations, and therefore produces very robust entropy calculation results.

According to one embodiment, the values of the classification vector are shifted such that all values are positive prior to determining the Shannon entropy, as this is a requirement for being able to calculate the Shannon entropy.

According to one embodiment, the confidence measure of the classification vector is determined by calculating a mean value for the values in the classification vector, and comparing the individual values of the classification vector to the calculated mean value, wherein a larger difference in values indicates a greater confidence measure. This is an alternative, lightweight method, to entropy calculations, which is also suitable for implementation on an embedded device.

According to one embodiment, the images in the sequence of images are captured at a sample rate of approximately five frames per second. This creates a good balance between accuracy and required computational power. However, as the skilled person realizes, the sample rate can also vary greatly depending on the specific circumstances at hand.

According to one embodiment, each image crop is scaled to a particular size appropriate for the artificial neural network, prior to feeding the image crop to the artificial neural network. This enables the artificial neural network to process the images efficiently and with low-cost computational power.

According to one embodiment, tracking the object is done using one or more of: a motion-based object tracker, a texture matching system, and a radar system. This provides a range of options for object tracking, each of which (or combinations of which) may be particularly useful in specific surveillance situations.

According to a second aspect, the invention relates to a system for classifying an object occurring in a sequence of images. The system includes a processor and a memory. The memory has instructions that when executed by the processor causes the following operations to be performed by the processor:
- tracking the object through the sequence of images;
- generating, from the sequence of images, a set of temporally distributed image crops including the object;
- feeding the set of image crops to an artificial neural network trained for classifying an object;
- determining, by the artificial neural network, a classification result for each image crop;
- determining a quality measure of each classification result, wherein the quality measure is determined based on one or more of: a confidence measure of a classification vector output from the artificial neural network, and a resolution of the image crop;
- weighting the classification result for each image crop by its quality measure; and
- determining an object class for the object by combining the weighted output from the artificial neural network for the set of images.

According to a third aspect, the invention relates to a computer program for classifying an object occurring in a sequence of images. The computer program contains instructions corresponding to the steps of:
- tracking the object through the sequence of images;
- generating, from the sequence of images, a set of temporally distributed image crops including the object;
- feeding the set of image crops to an artificial neural network trained for classifying an object;
- determining, by the artificial neural network, a classification result for each image crop;
- determining a quality measure of each classification result, wherein the quality measure is determined based on one or more of: a confidence measure of a classification vector output from the artificial neural network, and a resolution of the image crop;
- weighting the classification result for each image crop by its quality measure; and
- determining an object class for the object by combining the weighted output from the artificial neural network for the set of images.

The computer program involves advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Overview

As was discussed above, one goal with the various embodiments of the current invention is to improve classification techniques for objects occurring in a video stream, by using several, temporally distributed (i.e. from different images in a video stream), images or image crops depicting the same object and feed those to an artificial neural network, such as a CNN.

An object tracker, such as a motion-based object tracker, texture-based object tracker, or radar (or any combination thereof) is used to locate the object in several images in the video stream. These different images of the object are fed to a CNN classifier, combining the output into a single classification. Compared to the conventional approach of creating multiple crops from a single image, this inventive approach results in the image crops being both spatially and temporally distributed, thereby increasing the intra-class variation.

In addition, a quality measure is determined for the output from the CNN classifier in a way that takes into consideration the entropy of classification vectors and/or the resolution of input images. Depending on the distance to the camera, the image crop has a higher or lower resolution. Images having a higher resolution have a higher quality. Thus, those images should have a larger impact on the final classification result.

By letting higher quality images have higher impact on a classification, the accuracy of classifications will increase. One benefit of using a quality measurement to weigh classification scores is that the quality of CNN classifiers can be increased by lightweight calculations, without adding complexity to the network architecture itself. Applying the quality measurement weighing to several images of the same object, and combining the classifications into one, further improves the quality of the classifications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Object Classification

The techniques in accordance with various embodiments of the invention will now be described by way of example and with reference to FIGS. 1-8.

Figure 1:
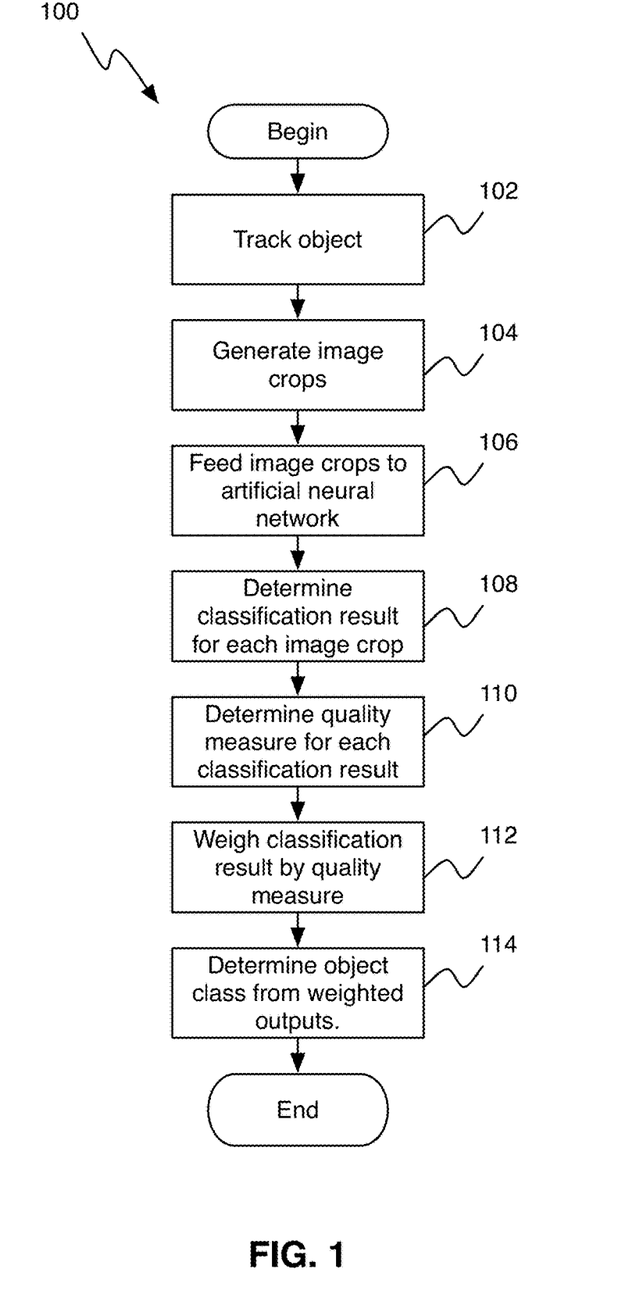
FIG. 1 shows a flowchart of a method for classifying an object occurring in a sequence of images, in accordance with one embodiment.

FIG. 1 is a flowchart showing a process 100 for classifying an object occurring in a sequence of images, in accordance with one embodiment of the invention. As can be seen in FIG. 1, the process 100 begins by tracking an object through the sequence of images forming the video stream, step 102. In one embodiment, the images are captured by a video camera at a rate of approximately five frames per second. However, as the skilled person realizes, this is just an example and the frame rate can vary considerably depending on the particular situation.

The purpose of the object tracking is to identify and track an object that occurs in consecutive video frames, for example in a surveillance situation, such that the object can be cropped from the respective image frames and fed to the artificial neural network, as will be described in further detail below. The identification and tracking can sometimes be challenging when the object is moving fast relative to the frame rate. This is one reason why the frame rate preferably may be varied depending on the particular surveillance situation, as described above. Another challenging situation that increases the complexity of the problem is when the tracked object changes orientation over time. For these situations various motion model can be used, which describe how the image of the object might change for different possible motions.

A variety of tracking algorithms exist that are familiar to those having ordinary skill in the art. There are two major components of a visual tracking system: target representation and localization, as well as filtering and data association. The target representation and localization algorithms are typically used to identify a moving object over a sequence of image frames. Some common target representation and localization algorithms include Kernel-based tracking and Contour tracking. Filtering and data association algorithms allow the tracking of complex objects along with more complex object interaction, such as tracking objects that move behind obstructions. The computational complexity for these algorithms is usually much higher. Some common filtering algorithms include Kalman filter and Particle filter.

Objects can also be tracked through the sequence of images using techniques such as texture matching and radar. By the comparison of object texture similarity with neighboring regions, the next state of the object can predicted. From a radar signal, it is possible to obtain the object velocity and movement direction, so that the object trajectory can be predicted. As was mentioned above, the exact method by which the objects are tracked may vary depending on the different embodiments. The important thing is to have the ability to reliably track an object through a series of images in a computationally efficient manner. Exactly how the tracking is implemented is of secondary importance.

Next, once the object has been identified in the different images, the object is cropped, step 104, from each image. Cropping objects from images is also well known to those having ordinary skill in the art. The cropping can be done, for example, by applying a polygon around the object. As a general rule, the smaller the margin is around the cropped object, the better the accuracy will be for recognizing the object by the artificial neural network. Since a moving object may result in different sizes of image crops between images (e.g., as an object moving away from the camera gets successively smaller in each image), at least some of the image crops may also have to be scaled in order to provide images of a consistent size to the artificial neural network. For example, assume the artificial neural network only accepts images of a size that is 200 by 200 pixels, and that an image crop is 200 by 500 pixels. In such a scenario, in order to avoid losing the aspect ratio of the image, it may be necessary to take a "sub-crop" of size 200 by 200 pixels from the image, or to keep the aspect ratio and scale down the whole image by the same factor, that is, by 40% to result in an image of 80 by 200 pixels, and then "pad" either side of the 80 pixels, to obtain a 200 by 200 pixel image crop to be fed to the artificial neural network. Many techniques for doing this exist that are well known to those of ordinary skill in the art.

After obtaining the image crops, they are fed to an artificial neural network that is trained to classify an object, step 106. Typically, the artificial neural network is a CNN, just like in conventional object classification scenarios. The last layer of the CNN contains as many outputs as there are object classes. Typically these kinds of classifiers have between 20 and 1,000 classes, but as the skilled person realizes, the number of classes may vary greatly depending on the particular implementation. The function and structure of CNNs are familiar to those having ordinary skill in the art, and will not be described here in any detail, as it is similar in this invention to conventional CNNs that are used in other object classification contexts.

It should, however, be mentioned that a CNN is merely one example embodiment of an artificial neural network that can be used in the various embodiments of the invention described herein. Other types of artificial neural networks, such as, back propagation neural networks, recurrent convolutional neural networks (RCNN) can also be used for object classification in accordance with the present invention. The back propagation neural network is a multi-layer feed forward network trained according to the error back propagation algorithm. This is one of the popular neural networks for classification tasks. The RCNN can perform object classification by incorporating recurrent connections into each convolutional layer. For purposes of explanation and illustration of the inventive concepts herein, however, it will be assumed that the artificial neural network is a CNN.

Next, the CNN determines a classification result for each image crop, step 108. This is typically done using conventional techniques. In one implementation, several convolutional layers are followed by a couple of fully connected layers. The fully connected layers contain as many outputs as there are classes, so that when a multinomial logistic regression function is applied, as will be described in further detail below, a probability for each class will be the result. The output from the CNN is a classification vector for each image crop, which indicates the most likely object class in each image crop. As the image crops come from a video stream, they are both temporally and spatially distributed, thereby increasing the intra-class variation.

Next, a quality measure is determined for each classification result, step 110. In one embodiment, the quality measure can be determined based on a confidence measure of the classification vector from the CNN, and the resolution of the image crop. While the embodiment described herein uses both the confidence measure and the resolution, in order to obtain the best available quality measure, it should be noted that they can also be used separately, although this may result in a quality measure that is not optimal for classifying an object.

In one embodiment, the confidence measure is determined by calculating an entropy, such as a Shannon entropy, for the classification vector. Briefly, entropy in this context is a measure of how likely it is that the object belongs to any of the classes. Shannon entropy, in particular, is a well-known way in communication theory for the lossless encoding. The computing of the entropy for a classification vector, which is suitable in various embodiments of the invention is described herein. Further, as was mentioned above, image crops having a higher resolution should have a higher impact on the object classification. From a mathematical standpoint, the way in which the confidence measure and resolution is taken into account can be expressed as follows:

Let $X(I_i) = \{x_1, x_2, \ldots, x_N\}$ be the classification vector of an object's i:th image crop, $I_i$. The combined classification vectors for K image crops of the same object can then be calculated as:

$$\overline{X} = \frac{1}{K}\sum_{i=1}^{K} Q_i X(I_i) \quad (1)$$

where $Q_i$ is a quality measure, based on two parameters:
1. $R(I_i)$ which is the resolution of $I_i$
2. $H(X(I_i))$ which is the Shannon entropy of $X(I_i)$ In one embodiment, $R(I_i)$ is simply the number of pixels in $I_i$. The Shannon entropy of $I_i$'s classification vector is calculated as:

$$H(\hat{X}) = -\sum_{i=0}^{N} \hat{x}_i \log \hat{x}_i, \quad \hat{x}_i \neq 0 \quad (2)$$

However, the classification vector may contain negative values, and in order to be able to calculate the Shannon entropy using equation (2), the classification vector needs to be shifted such that all its values are positive in accordance with equation (3) below, and then normalized as expressed in equation (4) below before the Shannon entropy is calculated.

$$X' = X - \min(x_{min}, 0) \qquad (3)$$

$$\hat{X} = \frac{X'}{\sum X'} \qquad (4)$$

The full quality measure Q is then given by equation (5) below, where α and β are scalars that can be experimentally defined. For example, alpha and beta can be optimized for a set of test image crops (either mixed or from a specific scene) using a Genetic Algorithm (GA), where the fitness function could be a sum over all image crops of σ (X) if the image crop was correctly classified, and −σ (X) if it was incorrectly classified (i.e., favoring correct classifications of high confidence and incorrect classifications of low confidence), where σ (•) is the Softmax, as defined in equation (7) below. The $\hat{X}$ in this case is the combined, weighted X of equation 1 above.

$$Q_i = \alpha \cdot R(I_i) + \beta \cdot \frac{1}{H(\hat{X}(I_i))} \qquad (5)$$

After determining the quality measure, a multinomial logistic regression function, such as a Softmax function, can be applied to the classification vector. The Softmax function is well known to those having ordinary skill in the art, and "squashes" the values of the classification vector into real values in the range of 0 to 1. As a result of applying the Softmax function, high activations in the classification vector are enhanced, while low activations are suppressed, which can benefit the training of the CNN, and makes it possible to interpret the output as probabilities of the image crop belonging to the different classes. In a preferred embodiment, the Softmax function is applied after the quality measure has been determined, as much information is lost after the application of the Softmax function, and this information is useful to have when calculating the Shannon entropy, as described above.

Next, after determining the quality measure in step 110, the classification result is weighted by the quality measure in step 112, for each image crop, such that certain image crops have higher weights and are considered more "important" than others, as expressed in equation (1) above.

Finally, the object class is determined from the combined weighted outputs of the various images by the CNN in step 114, which ends the process. This can be done, for example, by applying the Softmax function in order to get a probability for each object class and then selecting the object class that has the highest probability. This completes the process 100.

Experimental Results

In order to further illustrate the operation and advantages obtained in accordance with the various embodiments of the invention, the following two examples are provided, which shows some experimental results that were obtained using the inventive concepts described herein. In the experiments, two images of cars, Car A and Car B, were distorted with five levels of Gaussian noise, and five levels of occlusion, respectively.

Figure 2A:
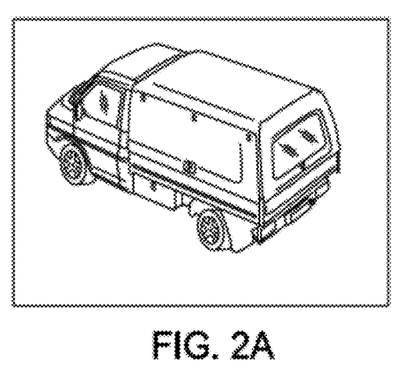
FIG. 2A shows an original image of a first car.
Figure 2B:
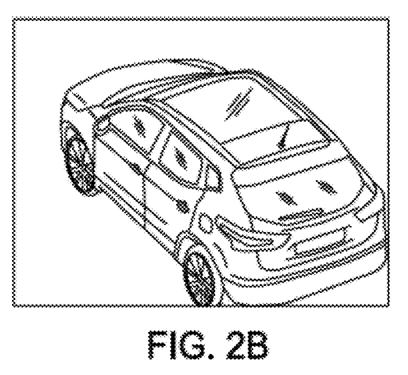
FIG. 2B shows an original image of a second car.
Figure 2C:
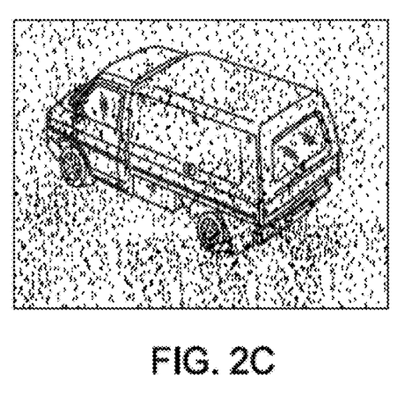
FIG. 2C shows an original image of the first car with a maximum noise distortion.
Figure 2D:
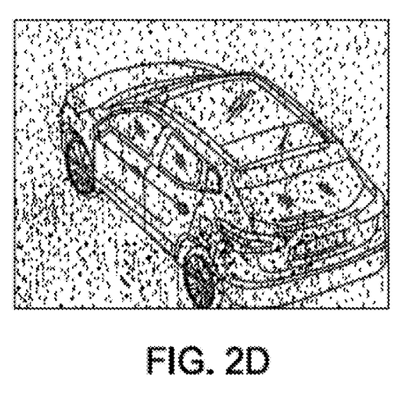
FIG. 2D shows an original image of the second car with a maximum noise distortion.
Figure 3:
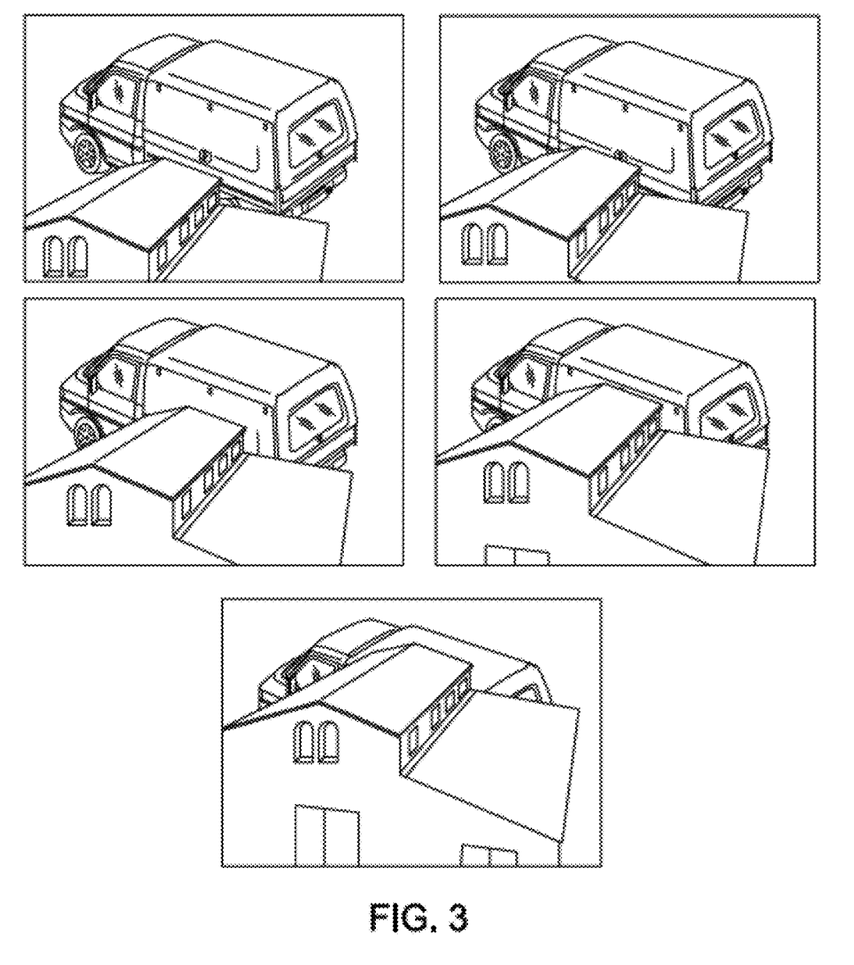
FIG. 3 shows a series of images of the first car with different levels of occlusion.
Figure 4:
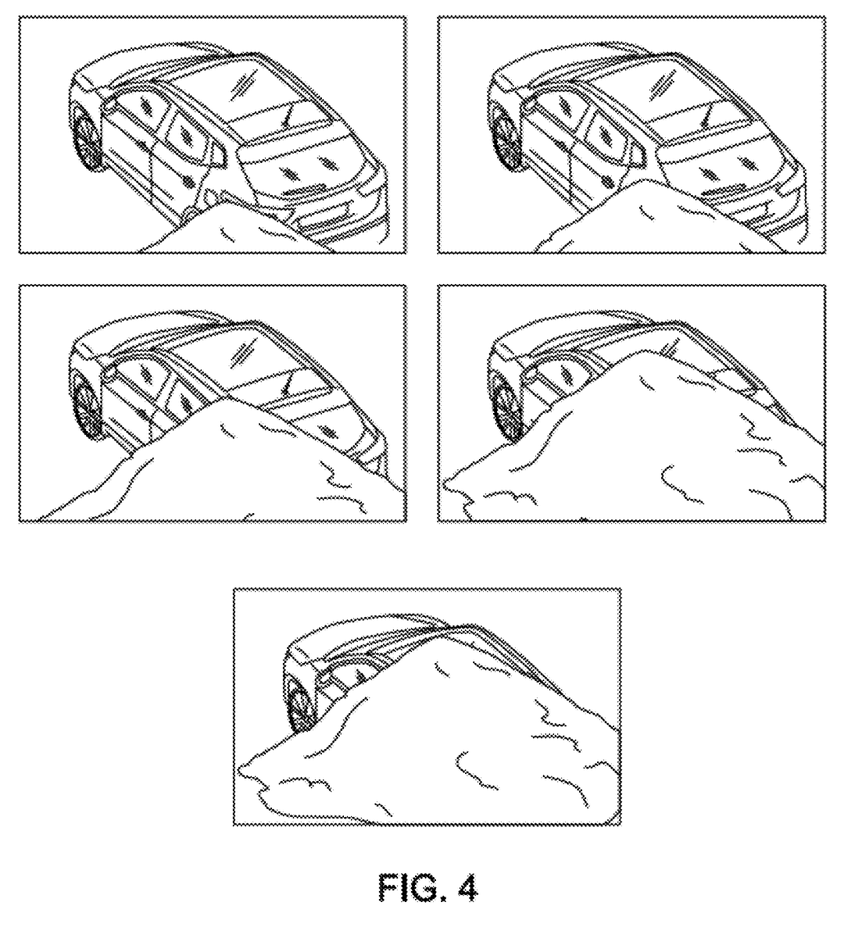
FIG. 4 shows a series of images of the second car with different levels of occlusion.

FIG. 2A shows the original image of Car A, and FIG. 2C shows an image of Car A with maximum distortion in terms of noise. Similarly, FIG. 2B shows the original image of Car B, and FIG. 2D shows an image of Car B with maximum distortion in terms of noise. FIG. 3 shows a series of images of Car A with different levels of occlusion, and FIG. 4 shows a series of images of Car B with different levels of occlusion.

Based on these images, a weighted confidence value is calculated per image, as shown in equation (6) below, where σ (•) is the Softmax, as defined in equation (7) below. It should be noted that α and β from equation (5) above are set to 0 and 1, respectively, in equation (6).

$$\sigma(QX) = \sigma\left(\frac{X}{H(\hat{X})}\right) \qquad (6)$$

$$\sigma(X)_i = \frac{e^{x_i}}{\sum_{j=1}^{N} e^{x_i}}, \quad i = 1, \ldots, N. \qquad (7)$$

The minimum possible Shannon entropy is 0, which occurs when one class has a confidence value (i.e., a probability value) of 1, and the rest of the classes have 0 probability. The maximum possible entropy value is achieved when all classes have equal probability. In this case the entropy is $$H(X) = -N \cdot \frac{1}{N}\log\frac{1}{N} = -\log\frac{1}{N} = \log N. \qquad (8)$$

In this particular experiment, the classification model of the CNN is trained for 27 classes, and thus the maximum entropy possible is log 27≈3.3.

Figure 5A:
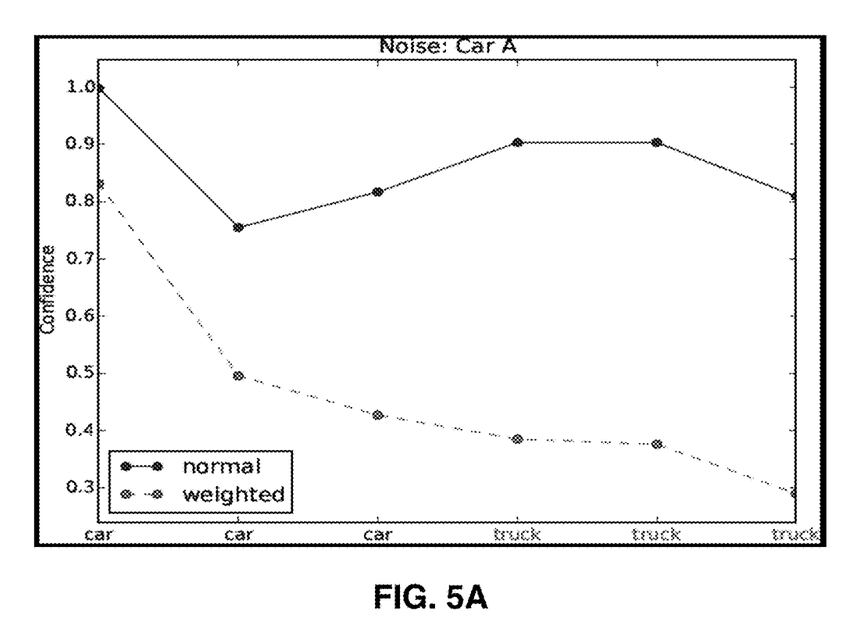
FIGS. 5A-5B show the impact of different noise levels for the first car and the second car, respectively, on the unaltered confidence and the weighted confidence, in accordance with one embodiment of the invention.
Figure 5B:
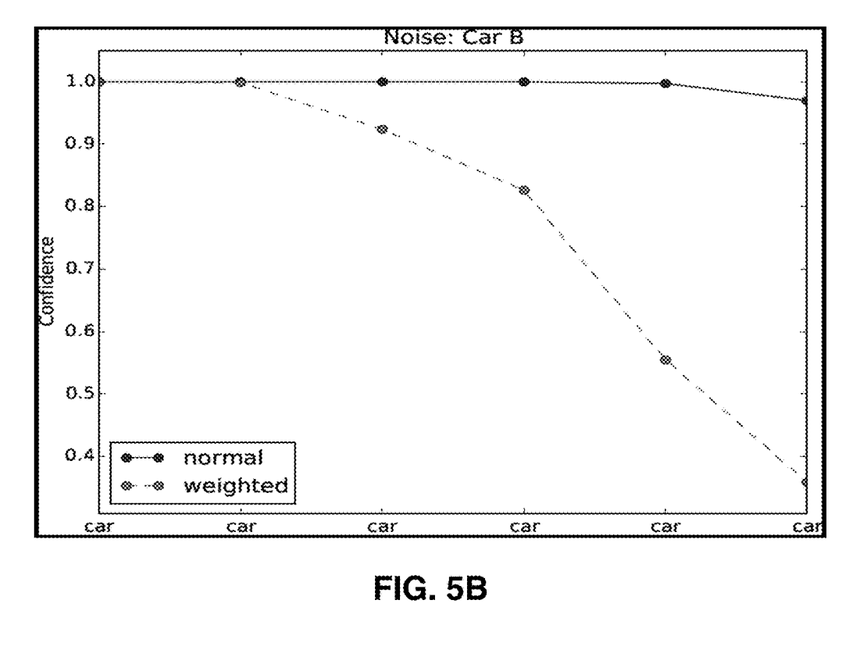

FIGS. 5A and 5B show the impact of different noise levels for Car A (FIG. 5A) and Car B (FIG. 5B), respectively, on the unaltered confidence and the weighted confidence, i.e., that shown in dashed lines. The weighted confidence is that of equation (6). As can be seen in FIG. 5A, as the noise level increases, Car A gets erroneously classified as "truck." Yet, the unaltered confidence (shown in a solid line) is high for these false classifications—even higher than for some of the correct classifications (i.e. "car" in the left hand side of the diagram). However, the weighted confidence decreases steadily and is lower for all false classifications (i.e., "truck") than for the correct ones (i.e., "car"). With respect to Car B, it can be noted that the impact of the noise is much less and Car B is consistently classified as "car" through all the noise levels.

Figure 6A:
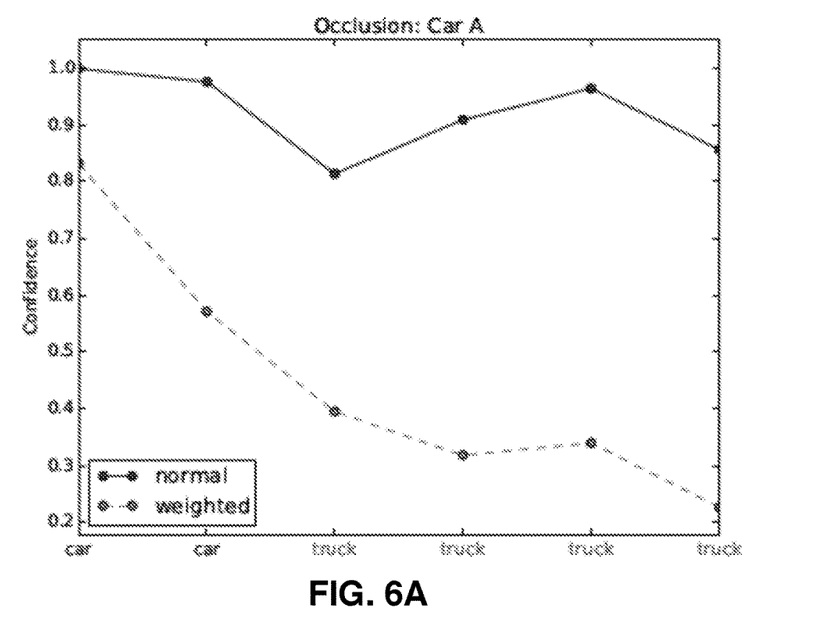
FIGS. 6A-6B show the impact of different occlusion levels for the first car and the second car, respectively, on the unaltered confidence and the weighted confidence, in accordance with one embodiment of the invention.
Figure 6B:
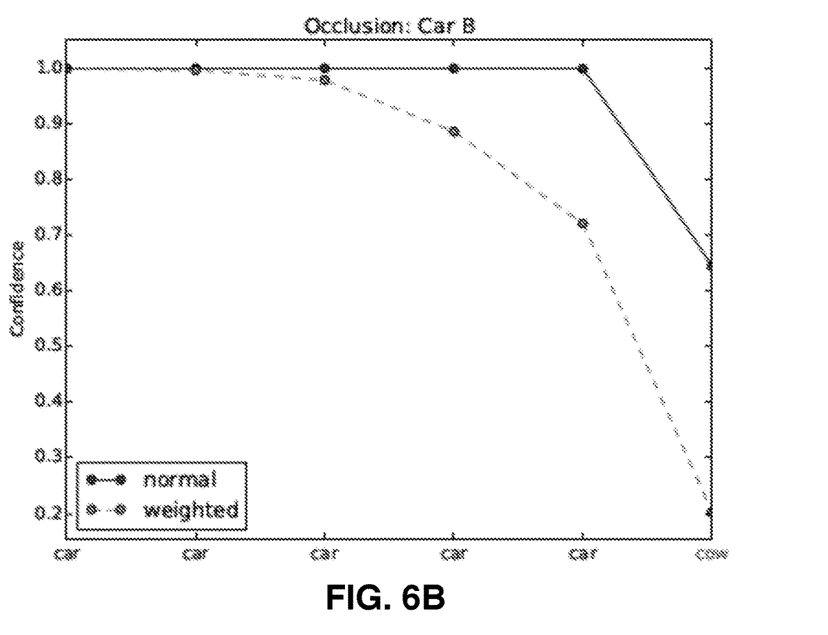

FIGS. 6A and 6B show the impact of different occlusion levels for Car A (FIG. 6A) and Car B (FIG. 6B), respectively, on the unaltered confidence and the weighted confidence, i.e., that shown in dashed lines. Again, the weighted confidence is that of equation (6). As can be seen in FIG. 6A, for Car A, the original image and the image with the lowest level of occlusion get classified as "car." However, for the remaining levels of occlusion, all images get classified as "truck." Similar to the noise levels of Car A shown in FIG. 5, the unaltered confidence (again, shown in solid lines) drops at first, and then increases for the false classifications. The weighted confidence (shown in dashed lines), on the other hand, is consistently lower for the false classifications. As for Car B, shown in FIG. 6B, it is clear from the weighted confidence that the classification gets more and more uncertain as the level of occlusion increases, until the image is finally erroneously classified as "cow," but with a very low confidence.

Figure 7A:
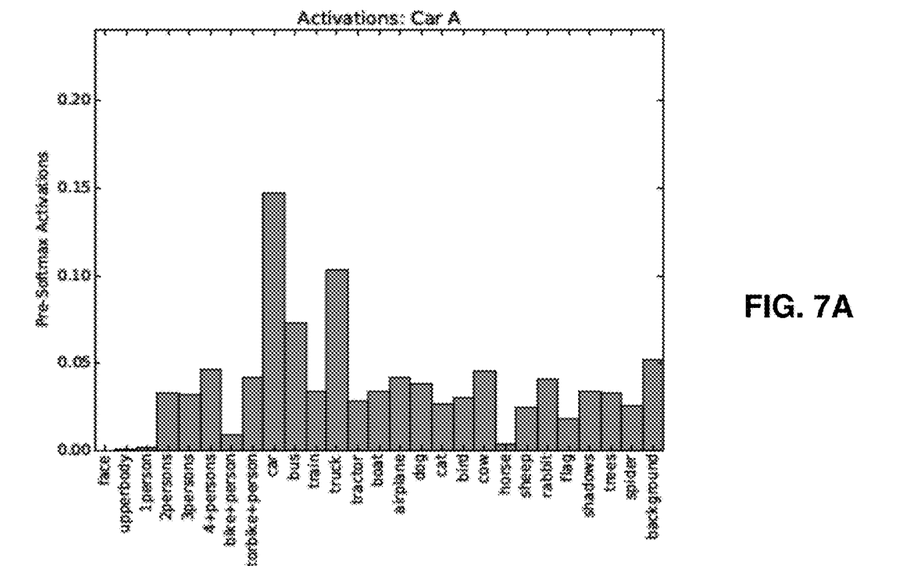
FIG. 7A shows the activations of the image of the first car before application of the Softmax function, in accordance with one embodiment of the invention.
Figure 7B:
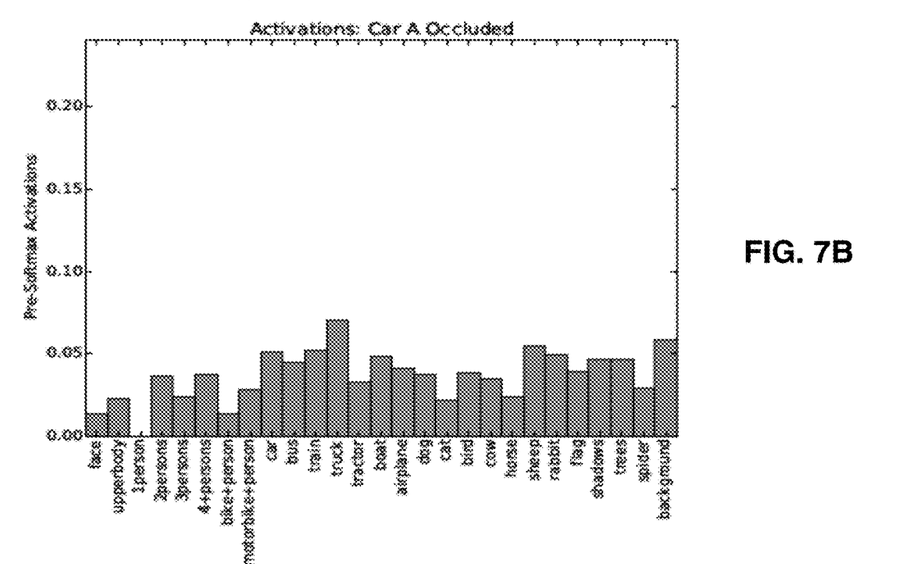
FIG. 7B shows the activations of the image of the first car with maximum occlusion before application of the Softmax function, in accordance with one embodiment of the invention.
Figure 8A:
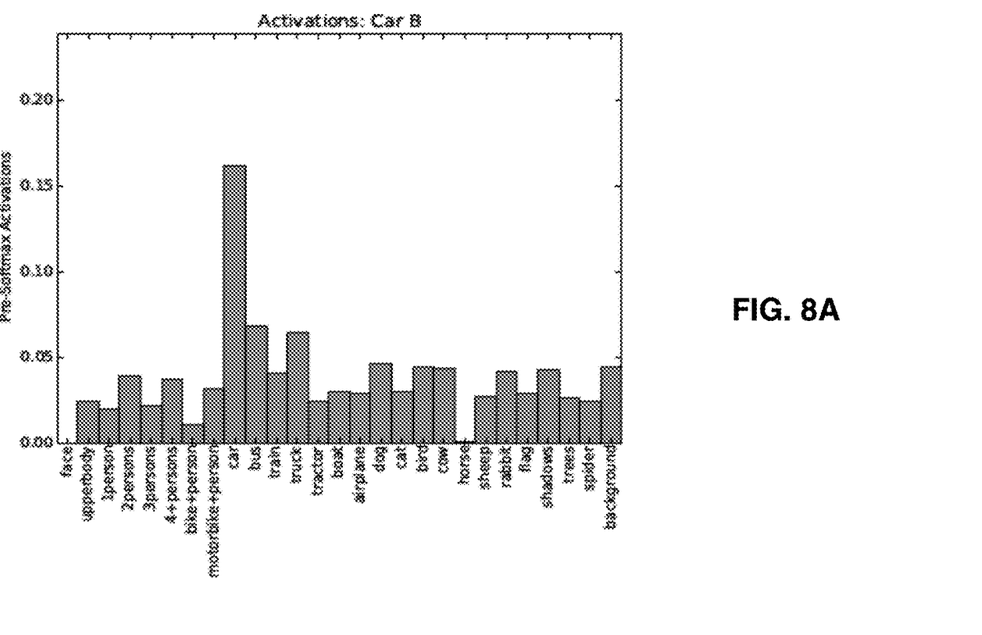
FIGS. 8A-8B show the corresponding activations as in FIGS. 7A-7B, for the second car, in accordance with one embodiment of the invention.
Figure 8B:
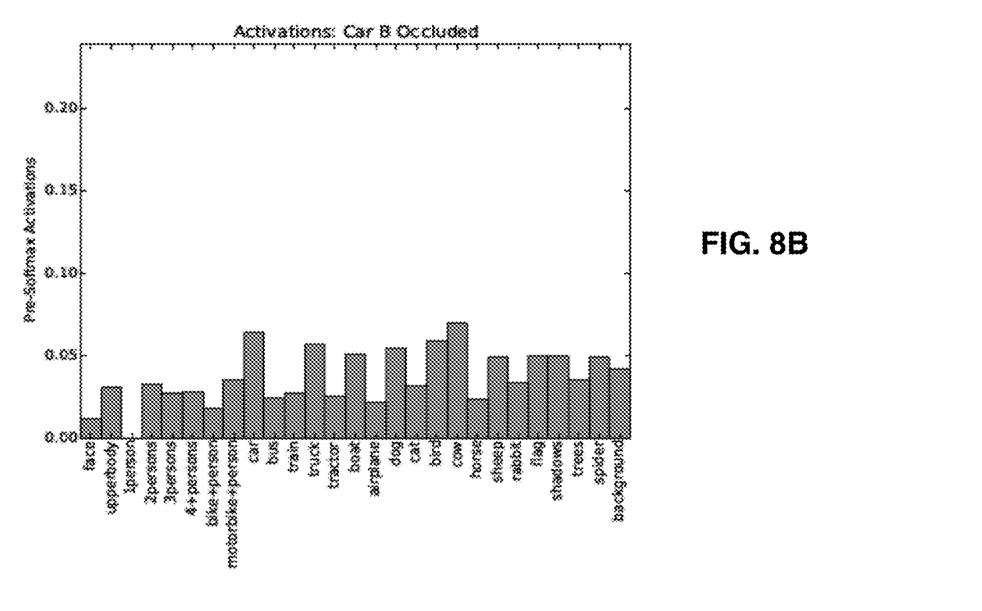

FIG. 7A shows the activations of the original Car A image before application of the Softmax function, and FIG. 7B shows the activations of the Car A image with maximum occlusion before application of the Softmax function. FIGS. 8A and 8B show the corresponding activations for Car B. The entropy for the activations of the original image of Car A, shown in FIG. 7A, is 2.99, while the entropy of the occluded image of Car A, shown in FIG. 7B, is 3.19. The corresponding entropies for Car B, shown in FIGS. 8A and 8B are 3.05 and 3.18, respectively. As can be seen, the higher the entropy, the less certain it is that the image crop belongs to any of the classes.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, instead of using entropy to determine the confidence measure of the classification vector, it is possible to calculate a mean value for the values in the classification vector and then comparing the highest value of the classification vector to the calculated mean value. Using this method, a larger difference in values indicates a greater confidence measure. Many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for classifying an object occurring in a sequence of images, comprising:
   tracking, by a processor, the object through the sequence of images;
   generating, by the processor and from the sequence of images, a set of temporally distributed image crops including the object;
   feeding, by the processor, the set of image crops to an artificial neural network trained for classifying an object;
   determining, by the artificial neural network, a classification vector for each image crop;
   determining, by the processor, a quality measure, $Q_i$, of each classification vector, wherein the quality measure, $Q_i$, is determined using the formula:

$$Q_i = \alpha \cdot R(I_i) + \beta \cdot \frac{1}{H(\hat{X}(I_i))}$$

in which $\alpha$ and $\beta$ are scalars, $R(I_i)$ is the resolution of the object's i:th image crop $I_i$, and
   $H(\hat{X}(I_i))$
   is a Shannon entropy of the classification vector for the object's i:th image crop $I_i$;
   weighting, by the processor, the classification result for each image crop by its quality measure; and
   determining, by the processor, an object class for the object by combining the weighted output from the artificial neural network for the set of images, wherein the object class is an object class for which the artificial neural network is trained.

2. The method of claim 1, wherein the sequence of images are obtained from a captured video stream.

3. The method of claim 1, wherein the artificial neural network is one of: a convolutional neural network and a back propagation neural network.

4. The method of claim 1, wherein the confidence measure of the classification vector is determined prior to applying a multinomial logistic regression function to the classification vector.

5. The method of claim 4, wherein the multinomial logistic regression function is a softmax regression function.

6. The method of claim 1, wherein the images in the sequence of images is captured at a sample rate of five frames per second.

7. The method of claim 1, further comprising:
   scaling each image crop to a particular size appropriate for the artificial neural network, prior to feeding the image crop to the artificial neural network.

8. The method of claim 1, wherein the tracking of the object is done using one or more of: a motion-based object tracker, a texture matching system, and a radar system.

9. A system for classifying an object occurring in a sequence of images, comprising:
   a processor; and
   a memory comprising instructions that when executed by the processor cause the following operations to be performed by the processor:
   tracking the object through the sequence of images;
   generating, from the sequence of images, a set of temporally distributed image crops including the object;
   feeding the set of image crops to an artificial neural network trained for classifying an object;
   determining, by the artificial neural network, a classification result for each image crop;
   determining, by the processor, a quality measure, $Q_i$, of each classification vector, wherein the quality measure, $Q_i$, is determined using the formula:

$$Q_i = \alpha \cdot R(I_i) + \beta \cdot \frac{1}{H(\hat{X}(I_i))}$$

in which α and β are scalars, $R(I_i)$ is the resolution of the object's i:th image crop $I_i$, and $H(\hat{X}(I_i))$ is a Shannon entropy of the classification vector for the object's i:th image crop $I_i$;

weighting the classification result for each image crop by its quality measure; and determining, by the processor, an object class for the object by combining the weighted output from the artificial neural network for the set of images, wherein the object class is an object class for which the artificial neural network is trained.

10. A computer program product for classifying an object occurring in a sequence of images, the computer program product comprising a non-transitory computer readable storage medium having program code embodied therewith, the program code being executable by a processor to perform a method comprising:

tracking, by the processor, the object through the sequence of images;

generating, by the processor, from the sequence of images, a set of temporally distributed image crops including the object;

feeding by the processor, the set of image crops to an artificial neural network trained for classifying an object;

determining, by the processor and the artificial neural network, a classification result for each image crop;

determining, by the processor, a quality measure, $Q_i$, of each classification vector, wherein the quality measure, $Q_i$, is determined using the formula:

$$Q_i = \alpha \cdot R(I_i) + \beta \cdot \frac{1}{H(\hat{X}(I_i))}$$

in which α and β are scalars, $R(I_i)$ is the resolution of the object's i:th image crop $I_i$, and $H(\hat{X}(I_i))$ is a Shannon entropy of the classification vector for the object's i:th image crop $I_i$ weighting, by the processor, the classification result for each image crop by its quality measure; and determining, by the processor, an object class for the object by combining the weighted output from the artificial neural network for the set of images.

\* \* \* \* \*